April 9, 1963 J. R. OISHEI ETAL 3,084,757
REMOTE CONTROL FOR CAR DOOR LOCKS
Filed Sept. 23, 1957 3 Sheets-Sheet 1

INVENTORS.
JOHN R. OISHEI and
BY WILLIAM C. RIESTER

Bean Brooks Buckley + Bean
ATTORNEYS

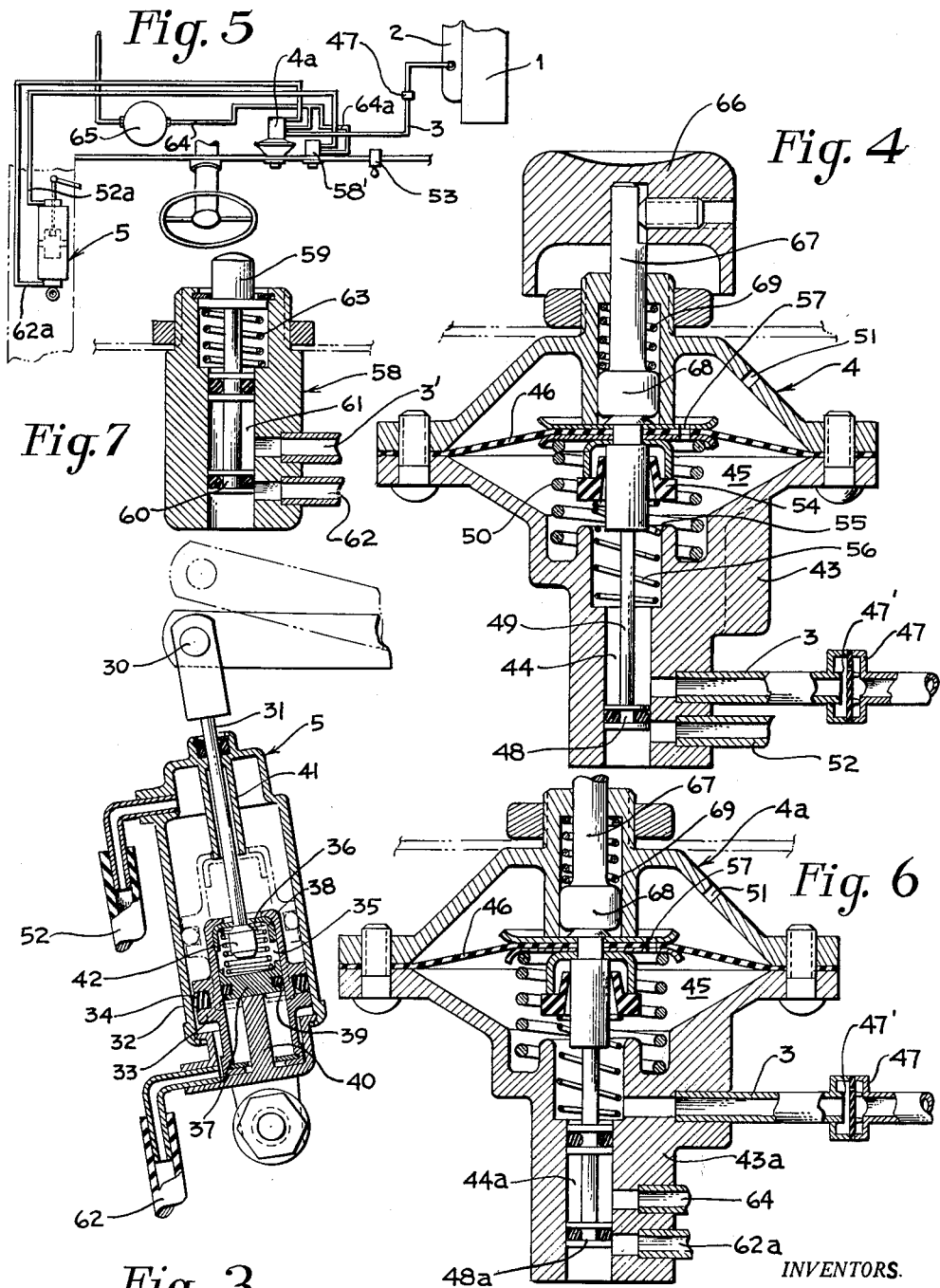

April 9, 1963 J. R. OISHEI ETAL 3,084,757
REMOTE CONTROL FOR CAR DOOR LOCKS
Filed Sept. 23, 1957 3 Sheets-Sheet 3
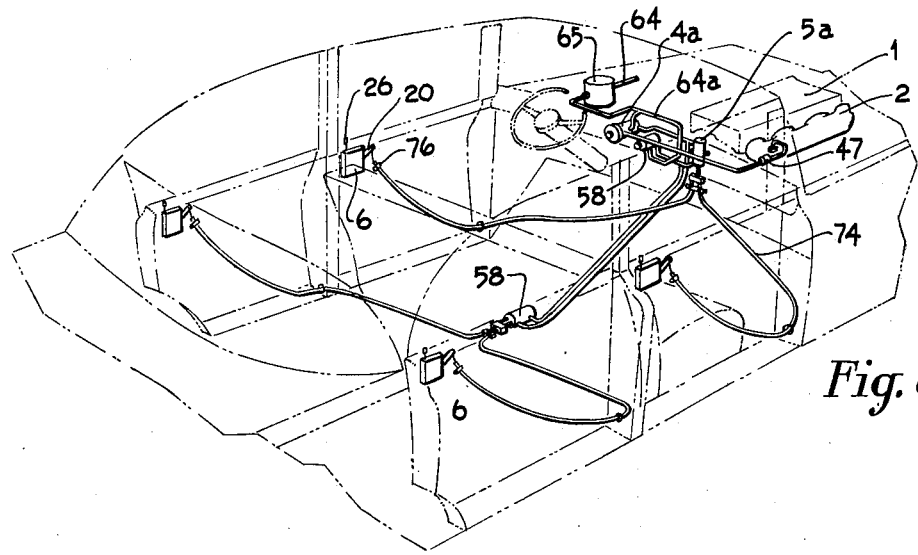
Fig. 8
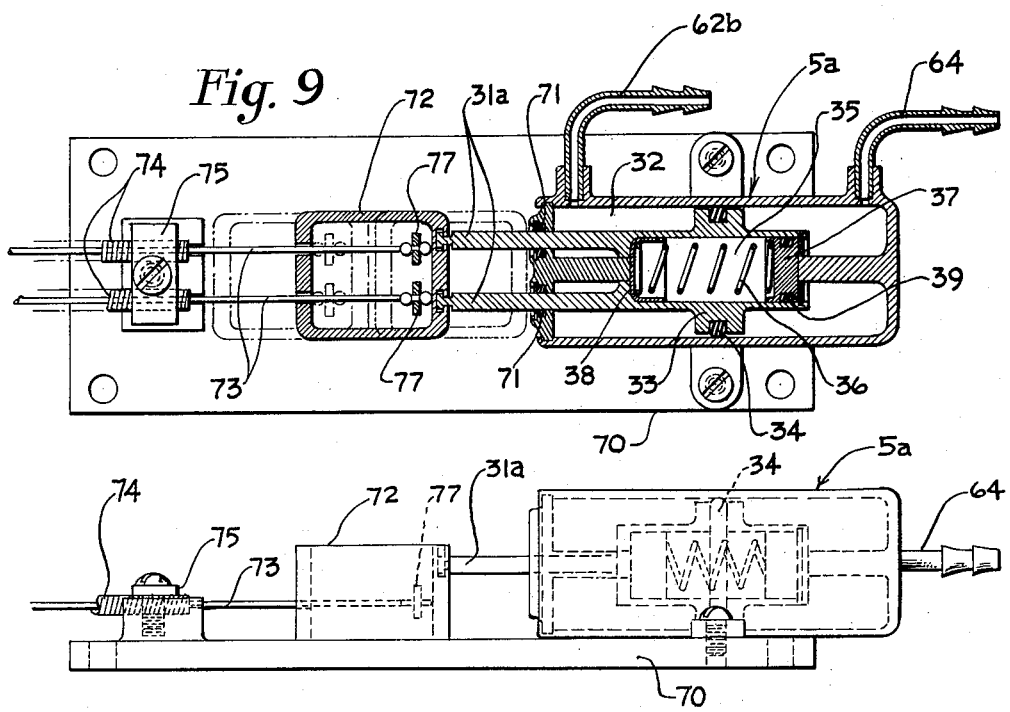
Fig. 9
Fig. 10
INVENTORS.
JOHN R. OISHEI and
BY WILLIAM C. RIESTER
Bean Brooks Buckley & Bean
ATTORNEYS 3,084,757
REMOTE CONTROL FOR CAR DOOR LOCKS
John R. Oishei and William C. Riester, Buffalo, N.Y.;
said Riester assignor to Trico Products Corporation,
Buffalo, N.Y.
Filed Sept. 23, 1957, Ser. No. 685,462
14 Claims. (Cl. 180—82)

This invention relates to motor vehicle door locking systems and especially to an arrangement to safeguard both against unlawful entry of a parked vehicle and felonious intrusion on a car stopped at signal controlled intersections and also in slow traffic. More particularly, the invention relates to the type of door-locking in which the usual door latch is made to perform the added function of a door lock by manually displacing an unlatching actuator to an inoperative position. This locks the door through the latch and necessitates the use of a key to replace the actuator to its operative position, or it may be accomplished manually from within the vehicle, before the door can be unlatched and opened. Therefore, in its more specific phase, the invention relates to a latch-locking system for motor vehicles.

In the majority, car operators fail to latch-lock their doors, which normally now imposes the necessity of manually depressing each of the separately positioned latch-locking mechanisms, some of which are remotely disposed and difficult for the driver to reach from his driving position. Thus unlocked, the doors may be freely opened from the outside. Many harrowing experiences have been recorded, including kidnapping and loss of life. With unlocked doors the motorist is left vulnerable to intruders, especially at stop lights and outlying traffic intersections.

The primary object of the invention is to provide an automatic safety lock that is responsive to the engine power system of the vehicle to automatically safeguard car operators from the crime menace, not only on the highways but from car "jumpers" operating within the city streets.

According to the present invention the doors of the motor vehicle are automatically latch-locked simultaneously with the starting of the engine, this being accomplished through latch-locking motor means and motion transmitting means carried in part by the respective doors, such transmission yielding to the usual door control handles which are accessible for interior manipulation by driver or passenger for exit from the vehicle. Thereafter, the plural locking motors may again be re-set to lock the vehicle against entrance from without. To permit a passenger to enter the vehicle, a control is placed within reach of the driver of the vehicle, to simultaneously unlock the door latches thereby to permit the opening of the doors through the use of the exteriorly disposed door knobs or handles. The arrangement is such as to enable the usual desirable and convenient opening and closing of the doors from within and also the unlocking of the door with the key from outside the car. However, when the locking motor means are operated, the exterior latch controls are rendered ineffective. After shutting off the engine, the motorist will only have to manually latch-lock the door through which he leaves in the usual manner; the other doors, previously automatically power locked, will remain locked.

In the present invention the standard door latch-locking mechanism is power actuated, the same being fitted, in one embodiment, with an individual servo unit to actuate its latch-lock with power in a manner heretofore accomplished by the latch-locking buttons customarily positioned on the window sill. A central power distributor is used as a master control to couple together and latch-lock all the doors simultaneously. As the vehicle engine is started, the intake manifold, or the auxiliary vacuum pump when used, will pull a high vacuum which is applied through the power distributor, which is in the form of a master control valve, for energizing the individual servo units and thereby automatically locking the doors. The power distributor, positioned to operate incidental to the conditioning of the vehicle for driving, is responsive to this initial pressure differential and comprises a suction actuated motor and a valve means actuated thereby to establish communication between the source of power and the remotely located servo units to energize them, the servo units being located in the respective doors and each being double acting to operate in one direction to lock the door latch and in the other direction to unlock it. The valve means is manually movable to relock the doors if opened during engine operation, and the doors may be unlocked by a reversal of power in the servo units either from the engine or from a reserve supply tank after the engine is shut off.

To unlock the doors, a common manually operated unlocking control is responsive to manual touch to operate the servo units in reverse for unlocking the door latches. Similarly, the power distributor is fitted with a manually operable actuator which is used to energize the servo units to re-lock any and all of the unlocked doors, whether they were unlocked by the power actuator, the door lever, or the use of the key from the outside. Manual operation of the power distributor or master valve is unnecessary if after unlocking the doors the engine has been shut off. Upon restarting the engine, the power distributor again works automatically to re-lock all the doors. At other times, a manual relocking is accomplished through a manipulation of the master valve.

Therefore, the invention has for its purpose to automatically latch-lock the doors of the motor vehicle at the time of and incidental to the starting of the vehicle to safeguard a thoughtless motorist against intrusion at traffic regulating signals when the vehicle has stopped or is moving slowly.

The invention further resides in an automatic door latch locking means which will permit the continued use of the present day manual latch-locks that have in the past enabled the manual opening of the doors individually from within and the key opening of the driver's door from without.

Again, an object of the invention is to provide an automatic system for the locking of the latches of the vehicle doors as a consequence of the performance required in setting the vehicle in motion, thus insuring through responsive action a resultant compliance to safeguard the occupants without requiring premediated action and, further, to insure that the door latches once automatically locked will remain locked until unlocked by an occupant. The driver of the vehicle does not have to think and cannot forget, since the locking of the latches is peremptory and takes place before the vehicle moves.

Another object of the invention is to repeat automatically the simple door locking action for relocking any doors which may have been manually unlocked either by power or by the door latch handles through power transmitting couplings of the normal driving mechanism of the vehicle coordinated with the door latch-locking system for conjoint operation of the driving mechanism and the latch locking system.

Still another object is to provide a latch-lock mechanism of simple design that employs a power unit, preferably in the form of a reversible fluid motor having a two-way movement, and, in this instance, comprising a servo cylinder or casing having a moving wall serving to power lock automatically and to unlock by manually directed power only.

The foregoing and other objects will present themselves as the following description progresses, reference being made therein to the accompanying drawings, wherein FIG. 1 is a phantom view showing the preferred embodiment of the present invention as a low pressure or suction operated locking system;

FIG. 3 is a similar view of the locking motor but showing its piston by solid lines in a door locking position prior to being restored to the normal position indicated by the broken lines;

FIG. 4 is a sectional view of an automatic master control and power distributor for the subatmospheric locking system;

FIG. 5 is a diagrammatic layout showing a superatmospheric pressure actuated locking system;

FIG. 6 is a view similar to FIG. 4 but modified thereover for use in a superatmospheric pressure system;

FIG. 7 is a detailed sectional view of an unlocking control;

FIG. 8 is a view similar to FIG. 1 but showing a further modification of the door locking system;

FIG. 9 is a plan view of a play-connection servo unit incorporated therein, with the servo unit being in section; and FIG. 10 is a side elevation of the play connection servo unit shown in FIG. 9.

Figure 1:
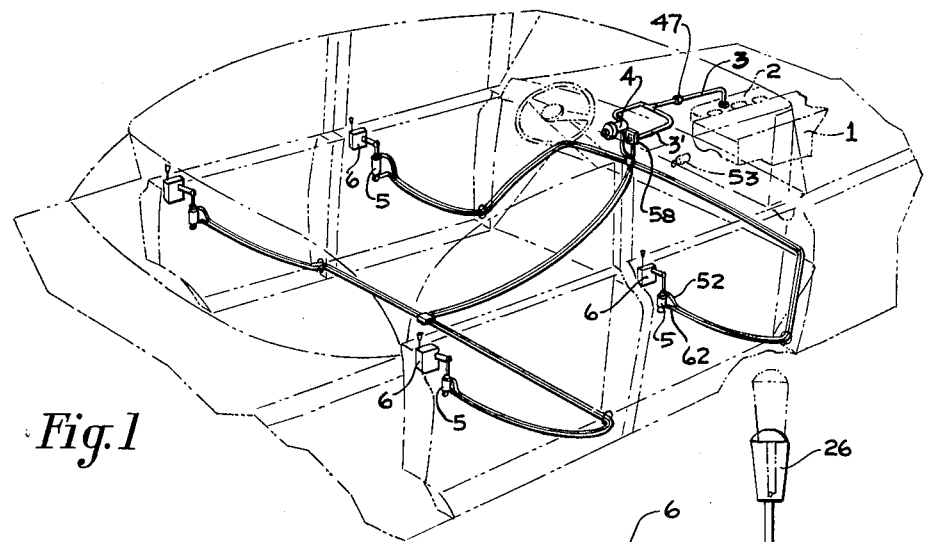

Referring more particularly to the drawing, the numeral 1 designates the usual internal combustion engine of a motor vehicle having an intake manifold 2 serving as a source of negative pressure and connected by a conduit 3 to a power distributor 4 which constitutes an automatic locking control for energizing the several servo motors 5, each being associated with the locking mechanism 6 of the respective door.

Figure 2:
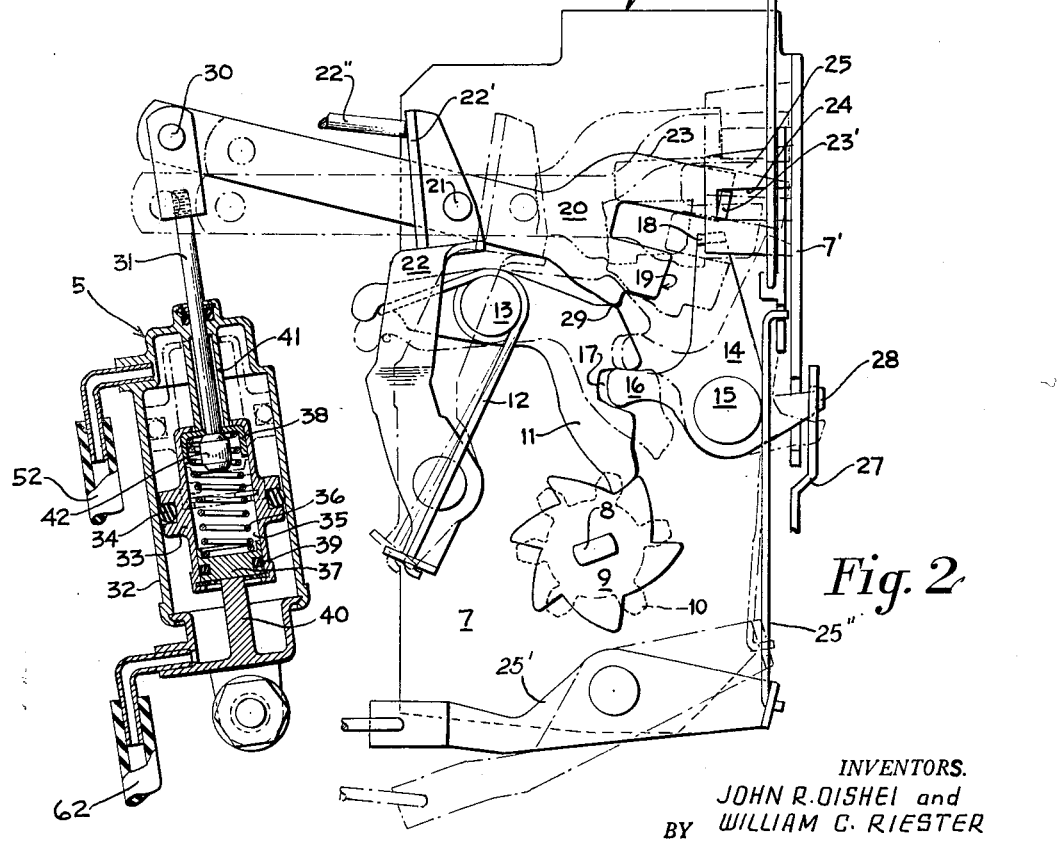
FIG. 2 is an interior view of a well-known type of a door lock incorporating a locking motor after the teaching of the present invention, the motor being in longitudinal section and its piston restored to normal position after having unlocked the door.

The latch-lock mechanism may be of any suitable design, the one shown in FIG. 2 being now in use on certain of the modern vehicles and comprising a body plate 7 in which is journaled a shaft 8 that carries a ratchet wheel 9 at the inner side of the plate and a rotary latch wheel 10 at its outer end, this rotary latch wheel being engageable with a striker plate (not shown) on the door post when the door is closing, and in so doing will revolve with the shaft 8 and ratchet wheel 9 as a unit. When the door is closed, an arresting pawl or locking member 11 drops into tooth engagement with the wheel 9 under the urge of a spring 12 to hold the door locked. The pawl 11 is pivotally mounted on a pin 13. A bellcrank type of lever 14 is pivoted on a pin 15 and has an arm 16 that engages in a recess 17 in the pawl 11. By rocking the bellcrank clockwise, the pawl will be retracted from wheel engagement, subject to return under the spring urge when released. The longer arm of the lever 14 is upturned to form a latch-freeing shoulder or lug 18 for engagement by a shoulder 19 of a lock bar or actuator 20. This lock bar is pivotally mounted at 21 on a lever 22 and has an arm 23 overhanging the shoulder 19 to position, either within the path of the lug 18 of the door latch mechanism 10, 11, 14, to unlock the latch and door, or without the path of the lug to lock the latch and door. The overhanging arm has a lug 23' inturned into a slot 24 of a positioning lever 25 for sliding support. This floating mount enables the locking bar to have either an idle stroke or an active stroke, depending upon the position of lever 25 which is pivoted on a marginal upturned flange 7' of the body plate 7. The mounting lever 22 has a bearing face 22' depressible by pin 22'' which is actuated against the urge of spring 12 and by the exterior door handle, not shown. Unless the lock bar 20 is properly positioned, as by a key inserted in the usual pin tumbler lock (not shown), or by the window button 26, the door cannot be unlatched from without. The usual inner door handle will always act through lever 27 on arm 28 to rock the bellcrank 14 and lift the latch arresting pawl 11, and also through the latter to lift the lock bar to its inoperative position by physical contact therewith at 29. FIG. 2 shows the lock bar by solid lines in its operative or door locking position; by single dot and dash lines in its door unlatched position; by double dots and dashes in an exterior handle-actuated idling position shifted from the solid line position; and by triple dot and dash lines in its inoperative position ready to unlatch the door when handle actuated.

In accordance with the present invention, the lock bar 20 is rockable by its servo motor 5 that may be energized by and during the initial surge of power either electrically or pneumatically for displacing the shoulder 19 from the path of the lug 18 when the vehicle engine 1 is started. To this end, the lock bar is extended outwardly beyond the lever 22 and is operatively connected, as by a pin 30, to a rod 31 of the servo motor. Herein, the motor is of the pneumatic type and has a chamber 32 and a piston 33, the latter embodying a play connection with the lock bar to permit manual locking and unlocking of the door in the customary manner. The piston is suitably packed at 34 and is formed with a compartment 35 holding a coil spring 36. The spring compartment is closed at one end by a slidable head 37 supporting one end of the spring; its opposite end being supported by a cupped head 38. The head 37 is sealed by packing 39 to preclude through-flow of the pressure fluid. Abutments 40 and 41 extend inwardly from the opposite ends of the chamber 32 for cushioned contact with the respective slidable heads 37 and 38 and function to compress the spring for restoring the piston to its normal intermediate position when relieved of operating pressure. The abutment 41 is tubular to admit the piston rod 31 and to afford sliding support therefor, the rod having an enlarged head 42 on its inner end. This construction provides the required play or freedom of relative movement between the lock bar and the servo motor for the usual manual operations.

The automatic power distributor is in nature a master control for the plural door locks. Referring to the embodiment shown in FIG. 4, it comprises a body 43 having a valve chamber 44 in open communication with the motor chamber 45 in which operates the pressure responsive piston or diaphragm 46. The suction line 3 connects the motor chamber 45 to the intake manifold 2, and in this suction line may be arranged a flap check valve 47 to hold the low pressure in the motor chamber should the suction drop off substantially at the manifold. Within the valve chamber 44 is arranged a power switching or valving element 48 carried by a valve stem or rod 49 which in turn is connected to the diaphragm and constitutes therewith a master control valve that is supported normally in an elevated position by the spring 50 to hold the valve 48 in closed position.

When a high vacuous condition is prevalent in chamber 45, the diaphragm 46 will be depressed by the difference in pressure relative to the outside atmosphere which is admitted through port 51 above the diaphragm. This pressure differential, when of a predetermined degree, will counteract the upward urge of spring 50 and by its depressive action will shift the valve 48 to establish communication between the suction supply passage 3 and the servo motor conduit 52 to effect a door-locking displacement of the lock bar 20 to its full line position, FIG. 2.

The numeral 53, FIG. 1, designates the key-operated ignition switch that has the usual electric circuit connections with the starter motor of the vehicle propelling power plant. When starting the vehicle engine 1, the initial surge of negative pressure will impress itself upon the diaphragm 46 and effect a depression of the valve 48 for connecting the suction line 3 to the servo motors for locking the doors. When this occurs, a second valving element 54, slidably carried by the valve stem 49 and depressible along therewith, engages an annular seat 55 for closing off the suction line 3 to the motor chamber 45. This valve controls a recycling of the master control during periods of high manifold suction and may remain seated until the low pressure within the valve chamber 44 dissipates and equalizes more or less with that in the motor chamber 45, whereupon a relatively light spring 56 will open the valve 54 to restore it to the position illustrated in FIG. 4 and to expose the diaphragm to the suction line 3 for the next start of the engine. The loss of negative pressure in the valve chamber 44 may be accomplished in a suitable manner, such as by a small bleed opening (not shown) through the flap check valve 47. Should the manifold suction drop during engine operations, as when the engine is laboring under a wide-open throttle, the check valve 47 will close to its seat 47' and tend to avoid a lower pressure fluctuating or repeating action of the diaphragm 46 and the valve 48. Under a low pressure differential, the light spring 56 will function to reopen the motor chamber 45 to the suction line and effect a repetition of the diaphragm movement for relocking any door which may have been previously unlocked. This repetitious automatic locking functions only in an instance where one or more of the door latches has been unlocked. Once locked, the locking member of the mechanism remains set in its latch-locking position, and any subsequent fluctuation of the diaphragm will act only in a locking direction and never to unlock a previously locked latch. After the diaphragm 46 has shifted the distributor valve 48 to its operative position and has seated the cycle-preventing valve 54, the low pressure in the motor chamber 45 will dissipate by reason of a time delay bleed port 57 through the diaphragm. Thus, the pressures at the opposite sides of the diaphragm become equalized to enable the heavier spring 50 to function in restoring the valve 48 to its normal position and in uncovering the end of the servo motor conduits 52 to vent the upper ends of the servo chambers 32.

The doors may be unlocked either manually or by key means in the customary manner. They may also be unlocked by the driver through the automatic locking system by an unlocking control 58 shown in section in FIG. 7. This unlocking control serves to reverse the pressure differential on the several servo motors to move their pistons 33 downwardly, thereby pulling the respective lock bars 20 with them to their inoperative position for latch actuation, as depicted in FIG. 3. Upon releasing the control button 59, the pistons will return to their normal medial positions to leave the piston rods 31 free for movement with the respective lock bars whenever they are manually operated. The unlocking control comprises a valving element 60 with a branch suction line 3' opening into a valve chamber 61. A servo supply link or conduit 62 leads from the control to the lower end of each servo motor 5 and is adapted to be connected to the branch suction line when the valve 60 is depressed against the urge of a spring 63 which latter restores the valve to its inoperative position wherein the communication between conduits 3' and 62 is broken and the conduit 62 is opened to the atmosphere, as shown. In effect, the piston 33 divides the servo chamber 32 to provide a dual chamber unit, with conduit 52 communicating with the upper, latch-locking chamber and with the conduit 62 leading into the lower, latch-unlocking chamber. Normally, the piston is in a pressure balanced state to facilitate the manual replacement of the latch actuator.

In the operation of the described embodiment, the surge of suction at the starting of the internal combustion engine will act through the distributor to shift the valve 48 to a position wherein the suction line 3 is connected through the conduits 52 to the several servo motors to power displace the latch actuators or lock bars 20 from their latch actuating positions and thereby render the latches of the several doors immovable from outside the vehicle. This initial result is paralleled in the repeated locking of the latches, after a manual unlocking, through the engine manifold suction variations as a result of acceleration and deceleration of the vehicle. This application of differential pressures for idling the exterior actuators for the latches of the doors is accomplished automatically and without any premeditation to thus serve as a safeguard against inadvertence on the part of the motorist. Intruders are automatically peremptorily locked out of the vehicle but the driver and passengers are never locked in. The power latch-locking by idling the exterior key controlled actuators is not discretionary but unavoidable, it being impossible to start the vehicle without having all of the closed doors locked against entry but not against exit.

This protection is automatically accomplished through a simple but unique combination of elements which affords a power actuation while permitting a manual actuation of the latchlock mechanism in a manner such that either actuation is performed without hindrance by the other, and both actuations work through the common latch. The latch-locking member of each door mechanism is operatively connected for both manual and power actuation. It has two actuators, one manual and the other power, and the power actuation is accomplished automatically at the starting of the vehicle but is nevertheless subject to cancellation by the manual actuation. With the vehicle once conditioned for operation, the latch-lock mechanism thus coordinated with the propelling mechanism of the automobile, while safeguarding against intrusion or unlawful entry, further preserves the protection of free exit for the individual occupants of the car.

After a power locking of the doors, the power application of each latch-lock mechanism is deactivated but said mechanism remains in a locked state subject to a selective unlocking either by hand from within or by a power reversal on the servo unit. Each door is likewise unlockable by the use of a car key acting through lever 25' and link 25'' to rock the lever 25 for properly positioning the latch actuator 20 so that a handle actuation of the pin 22'' will unlatch the door in the customary manner.

The effect of the variable suction influence is controlled automatically by the distributor through the use of calibrated distributor spring means so that the automatic relocking can be set to function within a fairly fixed range of vacuum to govern the relocking operation. The power, being momentarily applied to the latch-lock mechanisms through the pressure transmission line which latter includes the distributor 4, has its effectiveness prolonged for a brief interval by having the vacuous condition in the diaphragm chamber 45 controllably dissipated by a metered flow of air through the atmospheric bleed 57. This feature of the distributor controls the transmission of the suction to the servo units. The suction communication is established for a momentary dwell to hold the suction on the door locking side of the servos to assure their locking action at all times and particularly in extremely cold temperatures. Thereafter, the power becomes dormant and the doors remain locked by reason of the displaced actuators. The complete accomplishment of the suction dissipation enables the spring 50 to restore the valve 48 to its normal position for pressure balancing the servo units. Omitting the check valve 47 widens the range of effectiveness of a subsequent depression in the manifold with the opening of its throttle and the lowering of the vacuum, when followed by a resurge of higher vacuum. This fluctuation, resulting in the wider range of differential pressure on the distributor or master valve, is thus usable for a repeated application of power on the locking side of the servo units to relock automatically any latches unlocked in the interval. Thus through power transmitting couplings the vehicle's normal driving mechanism may be coordinated with the door latch locking system for conjoint operation of the driving mechanism and the door latch.

In the modified embodiment of FIGS. 5 and 6, the servo units are actuated by superatmospheric pressure while the automatic master control or pressure distributor 4a is made responsive to the starting of the vehicle engine, as by turning on the ignition key 53. The starting of the engine supplies the energizing suction, whether it be the manifold 2 or an engine driven suction pump (not shown), for the automatic master control so that the diaphragm motor will shift the valve 48a to connect the pressure supply line 64, which opens into the valve chamber 44a of body 43a, to the servo supply line 62a. This servo supply line opens into the lower ends of the servo motors to move their pistons 33 upwardly for displacing the lock bars to locking position. The pressure supply line 64 is connected through a pressure tank 65 to a pressure generating pump (not shown). An unlocking control 58', FIG. 5, is inserted in the pressure line to admit the higher pressure fluid to the upper end of the servo motors independently of the master control to position the lock bar for latch release, there being a branch pressure line 64a for this purpose.

In either embodiment, the higher air pressure is admitted through the lower end of the servo motor for effecting an upward shift of the outer end of the lock bar to its displaced locking position, while the unlock control serves to admit the higher of the two pressures into the upper ends of the servo motors for shifting the lock bar to its latch actuating position. When it becomes necessary to permit a passenger to leave the vehicle, or to admit an authorized person from without, the use of the unlocking control will render the latch locking mechanism inoperative, at which time the engine is idling and the cycle preventing valve 54 is unseated. Consequently, the diaphragm will be exposed to the suction line to relock any unlocked latch when the degree of suction is ample to shift the valve 48 to reconnect the suction line 3 to the servo line 52.

Or a manual relock control may be provided to shift the valve 48 (48a) to its operative position. Such manual relock control is in the form of a button 66 carried by a stem 67 and having a head 68 bearing upon or connected to the diaphragm 46 to depress the latter for so shifting the valve. A light spring 69 holds the manual relock control in contact with the diaphragm unit. It is only necessary for the driver to manually depress the button 66 to again reset the latch locking mechanism.

In a further embodiment, depicted in FIGS. 8, 9 and 10, a single servo motor is adapted to latch-lock two doors. This reduces the number of servo units required for transmitting the applied power to the lock bars. Like the embodiment in FIGS. 5 and 6, the system is adapted for superatmospheric pressure operation, with the automatic power distributor or master control 4a acting in response to the low pressure in the intake manifold 1 to which it is connected by the conduit 3 containing the interposed check valve 47 above referred to. The automatic control may be similar to that shown in FIG. 6, and associated with the system is the unlocking control 58 which is shown in section in FIG. 7 and is connected by the pressure supply line 64 to the pressure tank 65.

The two servo motors 5a (FIGS. 8, 9 and 10) are identical in function and operation in that each forms a play connection to accommodate manual manipulation from a normal medial position to which it is spring-returned. Each servo unit comprises a cylinder or chamber 32 and a piston 33 suitably mounted on a base 70, one end of the chamber 32 being connected to the control 4a through a conduit 62b while the opposite end is connected by a conduit 64 to the branch pressure line 64a. The piston 33 is of like construction as previously described, the same having a compartment 35 for its coil spring 36, the spring seating on a slidable head 37 at one end and on a slidable cupped head 38 on its opposite end, the head 37 being suitably sealed by packing 39. Likewise, the piston 33 is sealed by a packing 34. The piston rod is bifurcated to form two arms 31a for providing a balanced connection to a power transmitting linkage, the two arms sliding through packing glands 71 in the adjacent end head of the chamber 32. These two arms are connected at their outer ends to a differential link 72 which in turn is slidably connected by the two wire elements 73 of a Bowden cable to the respective lock bars 20 of the door locking mechanims 6 of a pair of doors. The Bowden cables have their usual armors or sheaths 74 secured at one end by a clamping anchor 75, and at the opposite end by an anchor 76. Each wire element 73 is slidably connected to the differential link 72 and is held against displacement by a stop 77.

In the position shown the Bowden cables 73, 74 have pulled the lock bars to their inoperative positions so that the respective latch mechanisms may be manually operated to unlatch and open the doors. To reach this position the differential link has been moved to the double dot and dash position in FIG. 9 and thereafter restored to its normal intermediate position by the piston spring 36.

To relock the doors, the servo piston 33 is pressurized through nipple 64 to move the differential link to the single dot and dash position in FIG. 9 and by so doing has positioned the stops 77 to the broken line position by which the lock bar is moved to its latch-locking position. When the unlocking control 58 is manipulated, the pressurized medium will be admitted through passage 62b to move the differential link 72 to the right and thereby pull on Bowden wire elements 73 for unlocking the latch.

The modification of FIGS. 8 through 10 reduce the number of servo units of the transmission, which latter comprise the Bowden cables, the servo units and their pneumatic links up to the master control. If desired, a straight mechanical transmission may be provided between the master control and each lock bar by having Bowden cable extensions connecting the control rod 49 to a resilient link similar to element 33 in an open guide 32 and then having the manual reset 66, 69 connected to the rod 49 for push and pull action. This will afford a transmission from the master control to the lock bars without the intervention of the pneumatic linkage and its servo units.

In any one of the embodiments, the vehicle doors are locked automatically with the starting of the vehicle engine, and without any specific door locking attention on the part of the driver. The power transmission 52, 5 (5a, 72, 73), with or without the servo motors, becomes active upon the functioning of the master motor 45, 46, and after the doors are latch-locked, the diaphragm 46 returns to a normal position while the cycle preventing valve 54 remains operative, with the assistance of the check valve 47 should the manifold suction be exceptionally low. The automatic door locking mechanism is normally atmosphere suspended and frees the usual locking mechanism for the customary manual and key manipulation. The lock bar 20 is herein illustrated as locking the door indirectly through the door latch, but the lock bar may serve to directly lock the door independently of the latch, if desired. The locked doors may be readily unlocked to permit a passenger to enter or leave the vehicle, and thereafter any door remaining unlocked can be restored to its locked condition by suction of a predetermined magnitude, or it may be accomplished manually through the relock control.

The foregoing description has been given in detail but without thought of limitation since the inventive concept is capable of assuming other physical embodiments without departing from the spirit of the invention and the scope of the appended claims.

What is claimed is:

1. An automatic latch locking system for the compulsory locking of doors of a motor vehicle before the vehicle is set in motion by its propelling power plant, comprising automatically operating plural latch locking mechanisms, each including a door latch and a locking member therefor manually operable from within the vehicle to free the latch for opening the respective door by one or another of plural operators, one of said operators being common to all doors, automatically acting fluid power valving means controlled by said one operator and having a pressure supply, a power means for each door having a movable wall responsive to differential fluid pressure on the opposite sides thereof for movement of and operatively connected to the respective locking member for securing its latch and thereby imposing a compulsory locking of its door automatically through said valving means while conditioning the vehicle for operation, and fluid conduit means connecting said valving means to each of the plural power means, said power means being normally under balanced pressure on opposite sides of said movable walls to permit the free manual operation from within the vehicle of the respective latch locking members.

2. A motor vehicle door locking system for peremptorily securing multiple car doors against opening from the outside while permitting each of said doors to be opened from within the vehicle, comprising a latch lock mechanism for each door, servo motor units for said latch lock mechanisms, power transmission means adapted to effect communication between said servo motor units and a source of power within the vehicle, said power transmission means including power switching means for causing said servo motors to effect automatic compulsory locking of said latch lock mechanisms incidental to the starting of said vehicle, time delay means operatively associated with said power switching means for maintaining said communication to enable said servo motors accomplishing their latch locking function and thereafter to actuate the power switching means for terminating such communication to remove the power from the latch locking mechanisms for subsequent manual actuation, manual means for unlocking said latch mechanisms when freed from said servo motors after said compulsory latch locking has been effected, and power means manually operable for reversing the direction of actuation of said servo units to unlock said latch mechanisms.

3. An automatic locking system for locking a motor vehicle against entry comprising a door in said vehicle, a latch lock operatively associated with said door, fluid servo motor means operatively coupled to said latch lock, a source of fluid power in said vehicle, power transmission means for effecting communication between said power source and said motor means incidental to a necessary condition experienced during the operation of said vehicle to thereby effect automatic locking of said latch lock, time delay means operatively associated with said power transmission means for prolonging said communication to enable said motor means to effect locking of said latch lock and thereafter to terminate the power transmission, latch lock operating means operatively associated with said latch lock to effect manual unlocking of said latch lock from within the vehicle after said communication is terminated, and means for causing said power transmission means to be conditioned for a subsequent automatic locking operation regardless of the operational condition of said latch lock operating means.

4. A motor vehicle having an engine providing a source of fluctuating fluid pressure upon the starting of the engine, door locking means having a latch and a lock therefor with means manually operable to position the lock to unlock the door latch, a pressure operated motor to power position said lock for locking said latch, and means associated with the pressure source to automatically energize the motor to compel the locking of the latch, said associated means including means responsive to variations in the fluctuating pressure for reenergizing said motor for relocking the latch if unlocked since the start of the engine.

5. A motor vehicle according to claim 4, wherein said responsive means comprises a fluid pressure motor having a piston chamber in open communication with the source, and a piston in the chamber operatively connected to a normally closed valve to hold the first motor deenergized against recycling action of the latter when the source pressure is below a predetermined degree but to open the valve for power locking when the pressure is higher.

6. A motor vehicle according to claim 4, wherein means are provided in said responsive means to prolong the power positioning action of the first motor.

7. A door locking system for a motor vehicle driven by an internal combustion power plant having a suction output, a door latch, an actuator, means for moving said actuator to a first position to free the latch for manual door opening and manually displaceable to a second position wherein the actuator will idle with respect to the door latch for door locking, suction operated power means coupled to said actuator, and means operatively coupling said power means to the output of said power plant whereby said power means is energized by and from the power plant when in operation to so displace the actuator by power to its second position for automatically locking the door, said power means including a normally closed valve and a suction actuated motor therefor responsive to the suction in the output to open for power locking and then to close the valve to leave the actuator normally free of the motor for manual locking and unlocking.

8. A door locking system for a motor vehicle having a source of fluctuating pressure for accessory operation, comprising a latch-locking mechanism having door latch means and lock means therefor including a locking member displaceable from the latch means to render it ineffective toward opening the door, manual means within the vehicle operatively connected to the displaceable locking member for manually locking the door thereby, a fluid pressure servo motor energized from said source and having a chamber with a relatively movable wall therein, said motor being operatively connected to said displaceable locking member and responsive to a fluid pressure impulse of a predetermined degree from said source for power actuation of said displaceable locking member for power locking the door, and normally closed control valve means for the servo motor acting normally to remove the influence of the latter from said displaceable locking member to facilitate its manual actuation when the fluid pressure is below such predetermined degree, said control valve means opening communication between the source and the servo motor in response to a pressure above the predetermined degree.

9. A door locking system according to claim 8, having other valve means for energizing the servo motor to power unlock the door.

10. A door locking system for a motor vehicle, comprising a latch-locking mechanism including door latch means and lock means therefor having a locking member displaceable from the latch means to render it ineffective toward opening the door, manual means within the vehicle operatively connected to the displaceable locking member for manually locking the door thereby, a double acting servo motor operatively connected to said displaceable locking member, power transmission means for connecting the motor to a power source and including a power switch control for the motor movable from a normal motor-deenergizing position to energize the servo motor, resilient means acting to restore the power switch control to its normal position to free the latch-locking mechanism from the servo motor for manual actuation, and time delay means functioning to retard the action of said resilient means to afford ample time for the energization and action of the servo motor.

11. An automatic latch locking system for the compulsory locking of doors of a motor vehicle before the vehicle is set in motion by its propelling power plant, comprising a plurality of latch locking mechanisms, each mechanism including door latch means and locking means therefor, one or another of plural operators manually operable from within the vehicle to free the latch for unlocking the respective doors, plural power actuated motor means normally in neutral balanced attitude, each motor means being responsive automatically to differential fluid pressure for movement in one direction from a neutral position for functioning to lock the respective latch means of a motor vehicle door, means to automatically cancel said motor movement while the lock remains locked and to restore said balanced attitude of said motor, secondary actuating means responsive to touch contact of manual initiation for extendingly applying differential pressure selectively for power locking of an unlocked latch, and manual means operable optionally to actuate said motor to relock the latch.

12. A door locking system for a motor vehicle, comprising, in combination with its internal combustion engine having an intake manifold, a latch-locking mechanism including door latch means and a locking member therefor, mechanical means manually operable for positioning the locking member with respect to the latch means to unlock and lock the latter, a servo motor in the form of a dual chambered unit having a dividing wall connected to the mechanism and operable by fluid pressure to power position the locking member thereof to lock the latch means, means normally maintaining said wall pressure-balanced to ease the manual operation, and means selectively establishing a power communication between the servo motor and the manifold to energize the servo motor for such power positioning, said dividing wall of the servo motor constituting a yieldable part yielding to the mechanical means during manual operation.

13. A door locking system for a motor vehicle, comprising, in combination with its internal combustion engine having an intake manifold, a latch-locking mechanism including door latch means and a locking member therefor positionable therefrom to lock its door, mechanical means accessible from within the vehicle and manually operable for positioning the locking member with respect to the latch means to lock and unlock the latter, mechanical means accessible from without the vehicle and manually operable for positioning the locking member with respect to the latch means to lock and unlock the latter, a fluid actuated servo motor in communication through open valve means with the intake manifold and operatively connected to the mechanism to position the locking member by the engine suction surge upon starting the engine to so lock the latch means, and automatic means operable to close the valve means after a time interval for subsequent manual operation.

14. A door locking system for a motor vehicle driven by an internal combustion engine, a source of fluid pressure operatively associated with said engine, a lock mechanism including a latch member and lock means therefor displaceable from a latch freeing position to a latch lock locking position thereby to lock the door through the latch member, a fluid pressure actuated servo motor operable to effect such locking displacement, a pressure distributor normally in open communication with the source and having a motor part responsive to its pressure for opening a normally closed valve leading to the servo motor to energize the latter for effecting such locking displacement, means operable to delay the closing of the valve for a time interval sufficient to effect the power locking displacement, and manual means operatively connected to the lock member to restore it from the power displaced locking position for unlatching the door.

References Cited in the file of this patent
UNITED STATES PATENTS

| | | |
|---|---|---|
| 2,198,862 | Chesler | Apr. 30, 1940 |
| 2,340,424 | Ott | Feb. 1, 1944 |
| 2,369,713 | Burgard | Feb. 20, 1945 |
| 2,450,372 | Craig | Sept. 28, 1948 |
| 2,459,029 | Ingres et al. | Jan. 11, 1949 |
| 2,505,401 | Ingres et al. | Apr. 25, 1950 |
| 2,506,851 | Ayers | May 9, 1950 |
| 2,716,568 | Davies | Aug. 30, 1955 |
| 2,799,154 | Beal | July 16, 1957 |
| 2,834,420 | Guess | May 13, 1958 |
| 2,913,921 | Gordon | Nov. 24, 1959 |